Feb. 8, 1966 S. O. SAMPSON 3,233,512
STEREO TAPE CONTROL APPARATUS FOR A SLIDE PROJECTOR
Original Filed Nov. 14, 1961 3 Sheets-Sheet 3
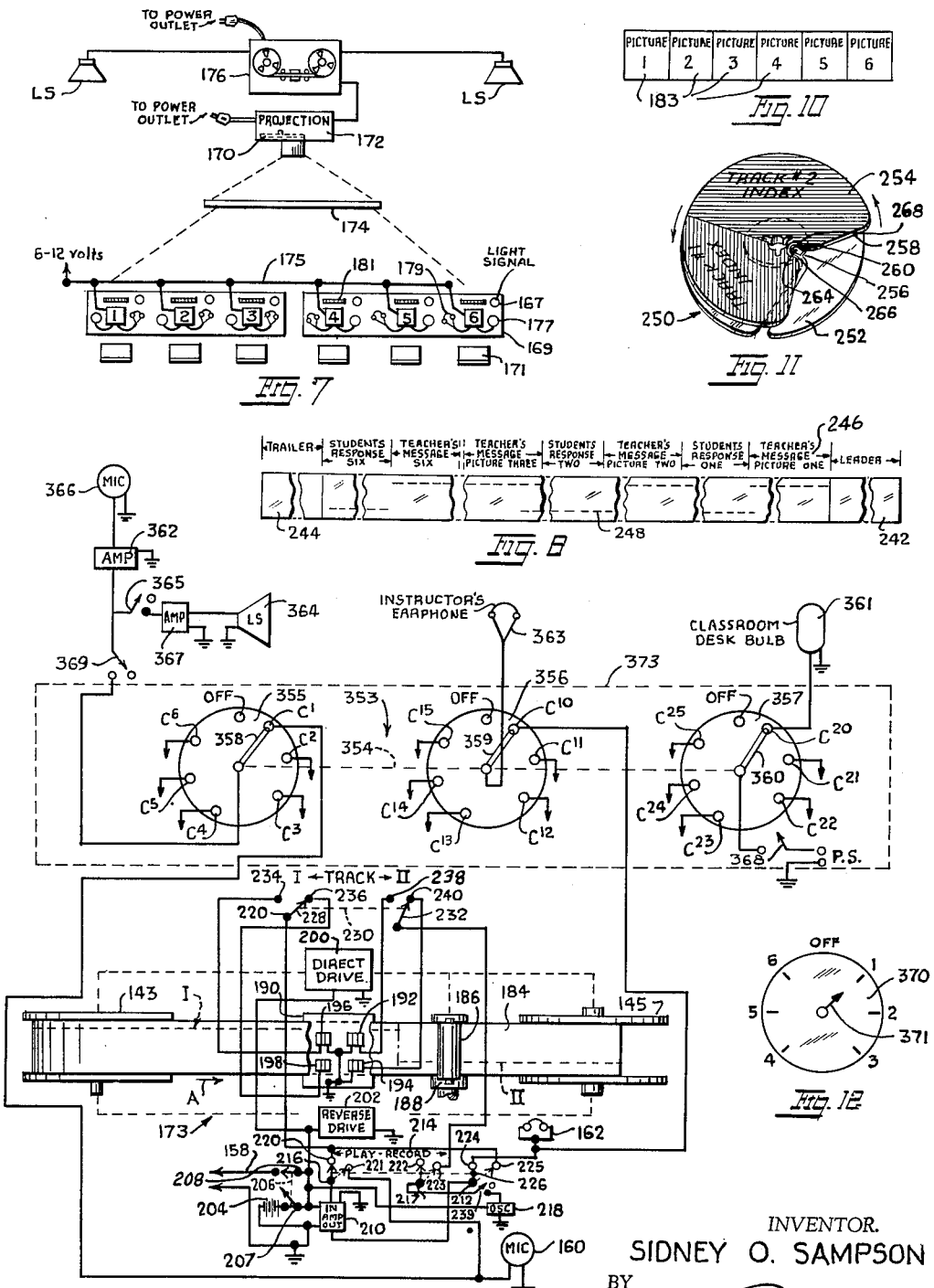
INVENTOR.
SIDNEY O. SAMPSON
BY
ATTORNEY

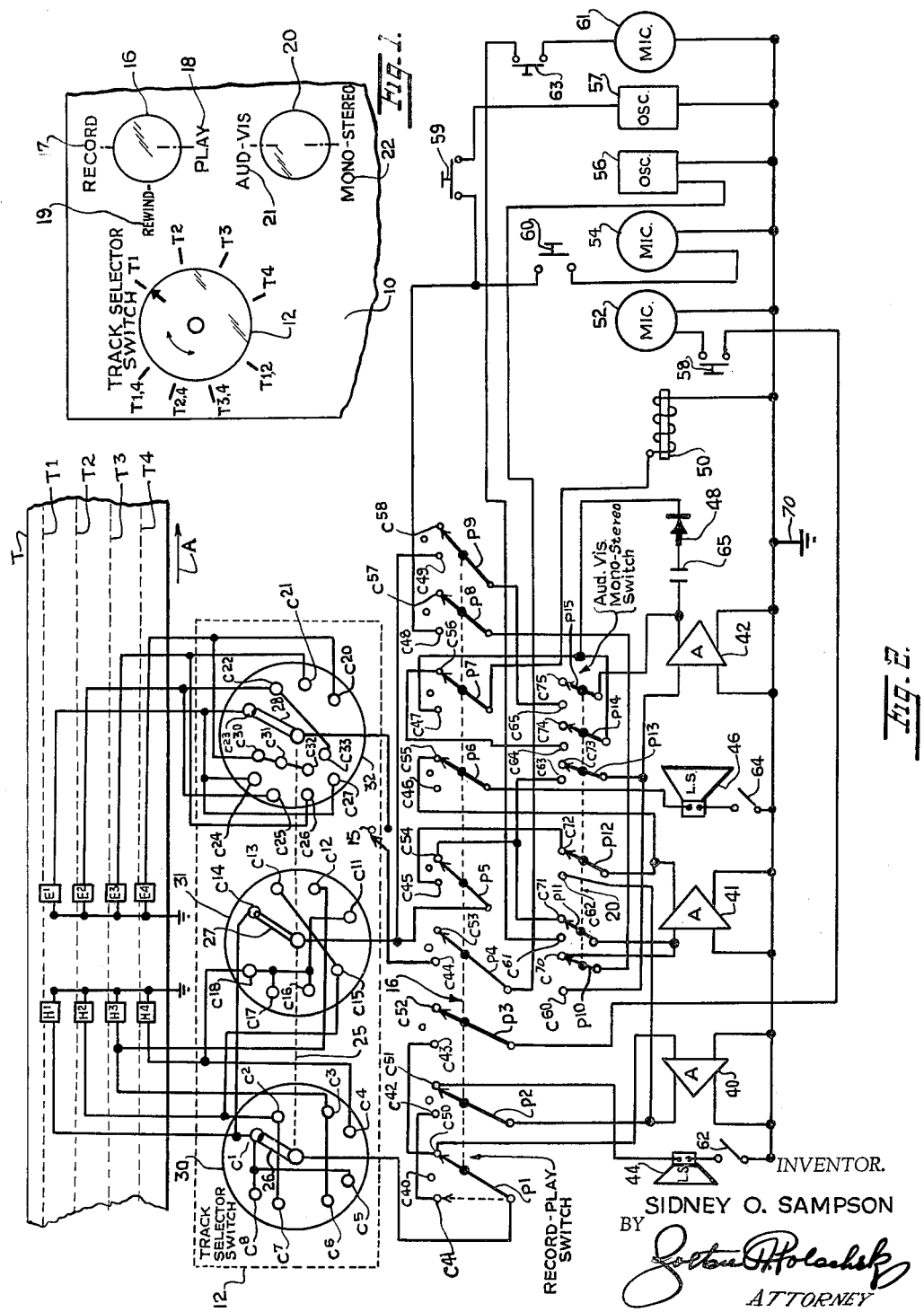

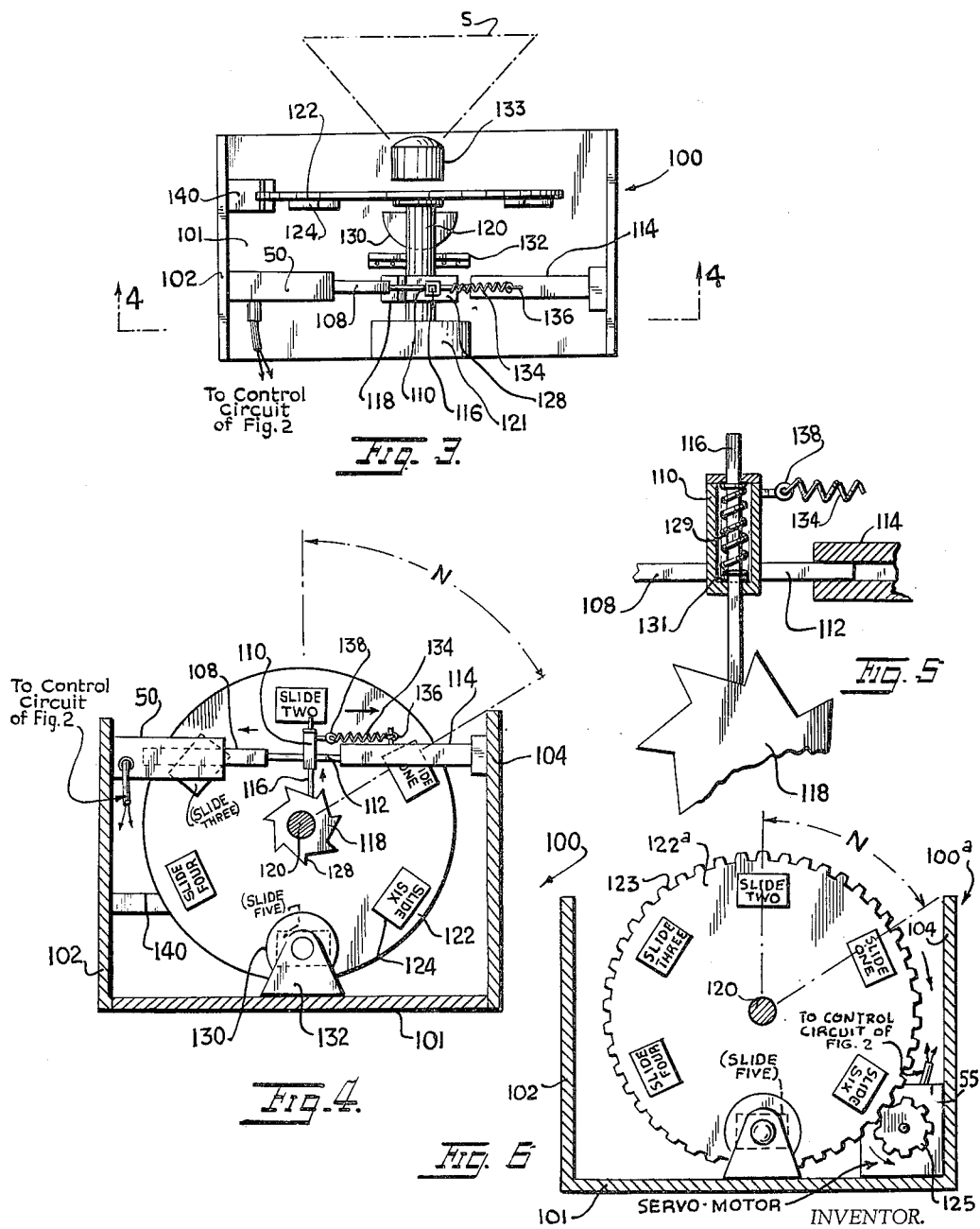

United States Patent Office 3,233,512
Patented Feb. 8, 1966

3,233,512
STEREO TAPE CONTROL APPARATUS FOR
A SLIDE PROJECTOR
Sidney O. Sampson, New York, N.Y., assignor to Robot
Education Systems, New York, N.Y., a corporation of
New York
Substituted for abandoned application Ser. No. 152,356,
Nov. 14, 1961. This application June 24, 1964, Ser.
No. 380,976
2 Claims. (Cl. 88—28)

The present invention includes the following three parts in their sequential "correlated" educational curriculum communication functions:

(1) The invention's recorder-projector is a device which the master educator utilizes for new-art preparation of "correlated" subject-matter educational programming on magnetic recording tapes and corresponding slides, and in relation with related "printed pictures." Said device is hereinafter known in the present invention as the "robot teacher."

(2) The invention's "parallel" tracks, single amplifier, one-way tape recorder is a device which the student utilizes to record on magnetic tape the audio broadcast of the "robot teacher." Said recorder provides the student with an educational "tool" to tape-capture all class lessons for his repeated "correlated" reviews in conjunction with school-provided "printed pictures" and texts which correspond with the slides that have been projected in the classroom.

(3) The invention's Central Control Console is a device which the classroom instructor utilizes for the usual question-and-answer periods after the audio-visual classroom presentation of "correlated" programmed subject-presentation matter by the "robot teacher." The present invention works out that the present "live" teacher who is hereinafter called "instructor" remains in complete control of the classroom through the use of said console device, even though relieved from past drudgery of daily lesson preparations and teaching. Said console device is very simple to understand and operate by the instructor as it has only a single, simple, operational control for automatically monitoring, individually, the actual study-work of each student in the classroom and for directly recording on each individual student's recorder tape, by the instructor, any systemized lesson instruction corrections, upon recognition-signals by or from either the student or the instructor.

The present invention is especially adapted for use in educational applications for several important psychological reasons. Heretofore the three most generally accepted visual aids employed in education have been text-books, film strips or motion pictures, and television. Where the student relied upon text-books alone, instruction was found inadequate because he lacked the advantages to be derived from the spoken word such as could only be provided by a teacher.

The use of motion pictures requires operation of elaborate projection equipment which is beyond the skill of the ordinary student and is prohibitively expensive. Television is limited by the fact that delivery of a lesson is only a one-time transient affair at a set time. Furthermore, both motion pictures and television have the disadvantage that to the average student, they suggest entertainment rather than serious educational purposes.

Magnetic tape has heretofore been largely used for scientific purposes. It has had only limited uses as an entertainment medium and its use suggests serious educational purposes, rather than pure entertainment. When used in association with a slide projector as in the present invention, a visual aid to education is supplied which the student can accept for concentration and learning rather than with an attitude that he is employing the apparatus only for entertainment.

The first part of the present invention concerns an improved system for educational programming and co-ordinating a multiple track tape recorder-reproducer with a visual slide projector. This part of the present invention is an improvement over the system disclosed in my application entitled Robot Educational Programming System, Serial No. 126,710, filed July 25, 1961, and now statutorily abandoned.

The present invention has as its principal object to provide an improved complete audio-visual education system especially adapted for use in all educational programs.

Another object is to provide a multiple track tape recording and reproducing apparatus associated with and controlling a slide projector.

A further object is to provide a multiple track recording and reproducing apparatus having track selector means for selecting any one track for monaural sound-on-sound, and control signal and sound recording and reproducing.

Still another object is to provide apparatus as described having further track selector means for selecting any one or two tracks for recording and reproducing sound on one or both tracks, or sound on one track and control signals on another track, or sound and control signals on any one track.

A still further object is to provide control means in an apparatus as described for selectively applying signals from one or two selected tracks to reproduce audio frequency signals audible and/or to control a visual slide projector by super-audible frequency control means.

Another object is to provide apparatus of the character described with unique selective recording and reproducing control means applying stereo amplifiers for recording and reproducing stereo audio signals and/or stereo audio and control signals and/or monaural and control signals on any one track.

Another object of the invention, according to a modification thereof, is to provide a complete set of coordinated electronic classroom apparatus including a Central Control Console operated by the classroom instructor for use during question-and-answer periods.

Other objects of the invention are to provide sound recording and reproducing apparatus which can be installed in classrooms, study halls, etc., for use and operation by students and instructors; to provide study materials including sets of "printed pictures" corresponding with the slides projected for the education of students; to provide study tapes for use by students, the tapes carrying messages corresponding to the several pictures and other related educational curriculum practices such as examination questions, teacher comments, etc.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front view of part of a control panel of apparatus embodying the recorder-projector part of the invention.

FIG. 2 is a diagram of a control circuit and associated components employed in the apparatus.

FIG. 3 is a top plan view of a slide projector employed in the system in association with the control circuit.

FIG. 4 is a sectional view taken on line 4—4 of FIG. 3.

FIG. 5 is a sectional view on an enlarged scale of part of the slide projector actuating mechanism.

FIG. 6 is a sectional view similar to FIG. 4 showing another slide projector which may be employed in the system.

FIG. 7 is a diagrammatic view of an electronic classroom seating arrangement according to a modified form of the invention.

FIG. 8 is a plan view of a student's magnetic tape, parts being shown broken away.

FIG. 9 is a diagrammatic view of students' recorder-producer equipment as provided at each student's seat in the classroom of FIG. 7 and an associated Central Control Console device.

FIG. 10 is a diagrammatic view of a picture strip as furnished to each student according to the invention.

FIG. 11 is a perspective view of a tape reel adapted for use with the present invention.

FIG. 12 is a diagrammatic view of the single-action switch control to operate the Central Control Console device.

Referring to FIG. 1, there is shown a control panel 10, having a Track Selector Switch 12 settable to any of eight different angularly spaced positions marked T1; T2; T3; T4; T1, 2; T3, 4; T2, 4; T1, 4. A Record-Play-Rewind switch 16 has three marked positions 17, 18, 19. A third switch 20 has two positions 21, 22 marked Audio-Visual and Monaural-Stereo.

FIG. 2 shows a magnetic tape T employed in the apparatus. The tape is driven as indicated by arrow A for recording or reproducing audio messages, signals or pulses on or from four tracks designated T1, T2, T3 and T4. Four magnetic heads H1–H4 are disposed adjacent the four tracks respectively for magnetically applying or receiving pulses from the respective tracks. Four signal erasing heads designated E1–E4 are disposed adjacent the four tracks in advance of the heads H1–H4 respectively for erasing recorded signals from the tracks when new signals are being recorded thereon. The tape is provided with tape drive means of conventional type including tape reels not shown for advancing the tape between supply and takeup reels during recording or reproducing and for reversing the tape drive to rewind the tape upon the supply reel.

The track selector switch 12 has a common insulated shaft 25 upon which are mounted three conductive arms 26–28. The shaft passes through three stationary insulated wafers 30–32. Each wafer carries eight uniformly spaced contacts C1–C8, C11–C18 and C20–C27. In addition, wafer 32 has contacts C30–C33 disposed adjacent to contacts C24–C27. A switch 15 is interposed in the wire of arm 28 of wafer 32. The novelty of switch 12 is particularly set forth in my copending patent application entitled Track Selection Control Means For Magnetic Signal Recording and Reproducing Systems, Serial No. 267,881, filed March 18, 1963.

The switch 16 has nine poles P1–P9 ganged to move together to any of three positions. Three stationary contacts are associated with each pole. The center contacts C40 are unconnected and serve as the Rewind position of the switch. Left contacts C41–C49 serve as the Record position of the switch and right contacts C50–C58 serve as the Play position of the switch.

Switch 20 has six poles P10–P15 ganged to move together right or left to either of the two positions. Left contacts C60–C65 serve as the Audio-Visual position and right contacts C70–C75 serve as the Monaural-Stereo position of this amplifier switch.

The apparatus employs three stereo amplifiers 40, 41, 42, two loudspeakers 44, 46, a rectifier 48, solenoid 50, microphones 52, 54, 61, and oscillators 56, 57 connected in circuit with switches 12, 16, 20.

Oscillator 57 has an operating, normally open push-button switch 59 connected to contact C48. Microphone 54 also has an operating, normally open push-button switch 60 connected to contact C48. Microphone 52 has an operating, normally open push-button switch 58 connected to pole P3. Microphone 61 has an operating, normally open push-button switch 63 connected to contact C61.

Loudspeakers 44, 46 have cut-out switches 62, 64. All components 44, 46, 50, 52, 54, 56, 57 and 61 have one grounded terminal. Stereo amplifiers 40–42 each have one grounded input terminal and one grounded output terminal. Heads H1–H4 and E1–E4 have one grounded terminal. The grounded terminals may be connected to a common ground line 70.

In FIGS. 1 and 2, the track selector switch 12 is shown set at T1 position. Switch 16 is set at Play position. Switch 20 is set at Mono-Stereo position.

The track selector switch 12 may be set at any one of eight different positions to select the tracks from which signals are to be picked up by heads H1–H4. In positions T1–T4 only the corresponding single tracks T1–T4 on tape T will be affected. In position T1, 2 tracks T1 and T2 will be affected. In position T3, 4 only tracks T3 and T4 will be affected. In position T2, 4 only tracks T2 and T4 will be affected. In position T1, 4 only tracks T1 and T4 will be affected.

The switch 16 will enable signals to be picked up from the tracks selected by the switch for reproduction by the loudspeakers or for application to solenoid 50, or will enable signals to be recorded on the selected tracks.

The switch 20 will enable the signals picked up from the selected tracks to be applied to amplifiers 40, 41 in Mono-Stereo position and to be applied to amplifiers 40, 41 and 42 in Audio-Visual position.

Suppose the operator sets the track selector switch 12 to any one of positions T1–T4, sets switch 16 to Play and switch 20 to Mono-Stereo position. Signals will be picked up from the selected tracks on tape T by one of heads H1–H4 and will be passed via one of contacts C1–C4 to pole 1 of switch 16. This will deliver the signals directly to the input of amplifier 40 connected to contact C50 of switch 16. The output of amplifier 40 will be applied to loudspeaker 44 via pole P2 and contact C51. Switch 62 will be closed to complete the circuit to the loudspeaker 44.

If the operator sets the track selector switch 12 to any of positions T1, 2; T3, 4 or; T2, 4 T1, 4 two heads will be selected for affecting two tracks associated with the head. If switch 16 is set to Record position and switch 20 is set to Mono-Stereo position, the following arrangement will ensue. Microphone 52 will be connected to pole P3 set at contact C43, connected to contact C50 and the input of amplifier 40. The output of the amplifier 40 will be applied to pole P2 set at contact C42, connected to contact C41 which is connected to arm 26 via pole P1 set at contact 41. Arm 26 will be at one of contacts C5–C8. Microphone 54 will be connected to contact C48 at which pole P8 will be set. Pole P8 is connected to pole P10 of switch 20. Pole P10 will be set at contact C70 which is connected to the input of amplifier 41. The output of amplifier 41 is then applied to pole P12 which is then at contact C72 connected to contact C45 at which pole P5 will be set. Pole P5 is connected to arm 27 set at any one of selected contacts C15–C18.

Suppose the operator selects the Audio-Visual position of the switch 20 instead of Mono-Stereo position, with switch 16 at Record and the same two-track selection as described above. The effect will be to connect the output of amplifier 42 to arm 27 instead of amplifier 41.

If switch 20 is set in Audio-Visual position, switch 16 is in Record position and the track selector switch 12 is at any two-track position. Then the output of amplifier 40 will be to arm 26 for recording signals on any of tracks T1, T2 or T3. The microphone 52 will be connected to the input of amplifier 40. The output of amplifier 42 will be applied via rectifier 48 to the solenoid 50 via pole P7 and contact C47.

Microphone 54 is employed for recording signals on any one of selected tracks T2 or T4 coordinated with message or instruction material prerecorded or being recorded on the associated tracks selected by switch 12. Microphone 54 is preferably an ultrasonic microphone which is actuated by applying super-audible frequency signals from a supersonic signal generator of any known type.

In the recording position of switch 16, the oscillator 56 applies erasing signals to any one or any two selected heads E1–E4 for conditioning and clearing the tape prior to recording new signals thereon. Stereo amplifiers 40 and 41 will be high fidelity audio amplifiers having ranges of at least about 60–15,000 cycles per second. The other stereo amplifier 42 can be of more limited range preferably having a response only in a narrow super-audible frequency range above 25,000 cycles per second.

According to the present invention, there is also provided an oscillator 57, which is connected via a push-button switch 59 in parallel with microphone 54. It is possible to close switch 59 to apply control signal pulses generated by the oscillator 57 to either of selected tracks T2 or T4 instead of control signals applied via microphone 54. The oscillator should generate pulses of super-audible frequencies.

It will be noted that contacts C11, C12, C13 and C14 are connected to heads H1–H4, respectively. These connections permit the super-audible frequency signals generated by oscillator 57 or microphone 54 to be applied to any one of the single tracks T1–T4 along with audio frequency messages provided by microphone 52. To effect this mode of operation, the track selector 12 will be set at any one of track positions T1–T4; the Record-Play switch 16 will be set at Record and the switch 20 will be set at Audio-Visual position. If switch 16 should be set to Play position after both audio frequency message signals and super-audible frequency control signals are applied to any track, then these signals will be picked up from the selected track. The audio frequency message signals will be reproduced via both sound-on-sound stereo audio amplifiers 40, 41 and loudspeakers 44 and 46, assuming of course that both switches 62 and 64 are closed. The super-audible frequency control signals will also be applied to amplifiers 40, 41 but will not be heard in loudspeakers 44, 46 since these loudspeakers have a reproducing range of about 60–15,000 cycles per second, while the super-audible control signals occupy a band-width above 30,000 cycles per second. A capacitor 65 effectively filters out any audio frequency signals which might pass the amplifier 42, so that only the rectified high frequency control signals reach the rectifier 48 and solenoid 50.

The recording/reproducing part of the system may be employed solely for sound or sound-on-sound recording and reproducing; in this respect, the switch 20, oscillator 57, and amplifier 42 and other unnecessary associated components can be eliminated from the operations.

The present invention further provides a microphone 61, which is connected via a push-button switch 63 to contact C61. If the selector switch 12 is set at any of the positions shown in FIG. 1, switch 16 is set at Record position, and switch 20 is set at Audio-Visual position, then pole P11 will be set at contact C61 and microphone 61 will be applied into the input of amplifier 41. The output of amplifier 41 will be connected via pole P12 set to contact C62 and via pole P2 which will be set to contact C42. Contact C42 which is connected to contact C41 will provide for connection of pole P1 to arm 26 of switch 12 depending on switch 63 being closed.

If the selector switch 12 is set at any of tracks T1–T4, switch 16 is set at Record position, and switch 20 is set at Audio-Visual position, then both sound-on-sound stereo audio amplifiers 40 and 41 have their outputs connected to the same magnetic heads H1, H4 of the selected track. This arrangement permits sound-on-sound type of recording on any one track in the audio frequency range. One microphone 52 drives amplifier 40 and another microphone 61 drives amplifier 41. Music could be applied to one of microphones 52, 61 and speech could be applied to the other microphone to record speech with a music background on a single track. After this sound-on-sound recording, the tape could be rewound, and then by opening normally closed switch 15 across the wire of arm 28 of wafer 32, control signals could be recorded on the same sound-on-sound track via microphone 54 or oscillator 57. Then upon resetting switch 16 to Play position, loudspeakers 44 and/or 46 would reproduce the sound-on-sound signals depending on which of switches 62, 64 were closed, while control signal pulses would be applied to the solenoid 50 via amplifier 42. Application of control pulses to the solenoid operates the slide projector of the apparatus.

The recorder/projector system may be employed solely for audio-visual purposes; in this respect, the switch 20 can be eliminated. The control means of the Record-Play switch 16 and of the signal generator and switch 12 remain in circuit with the heads and amplifiers. The switch 20 should be retained in the circuit as it lends versatility to the whole system.

Slide projector 100 is shown in FIGS. 3 and 4. On base plate 101 are spaced side walls 102, 104. Wall 102 supports solenoid 50 which carries a plunger 108 attached to a rectangular axially vertical tube 110. A shaft 112 is attached to tube 110 in alignment with plunger 108 and slides axially in a rectangular sleeve or tube 114 on wall 104. The tube 110 carries a freely slidable pawl element 116. The element has an angular lower end which engages and rides on the periphery of a sprocket 118 on shaft 120 journaled in bearing 121. The shaft carries and drives a disk 122 on which are spaced transparent slides 124. The slides are angularly spaced uniformly N° apart. Teeth 128 on sprocket 118 are similarly spaced. A spring 129 may be fitted in tube 110 (see FIG. 5) bearing on cross pin 131 in element 116 to assist downward movement of pawl 116.

A lamp 130 carried in bracket 132 projects light through any slide located in the lowermost projection position at which Slide Five is set as shown in FIG. 4. A lens 133 in front of the disk 122 projects an image of the slide on a screen S. A spring 134 is connected between a pin 136 on tube 114 and a pin 138 on tube 110 to shift the pawl element and extend plunger 108 from solenoid 50. The solenoid 50 is connected in the circuit of FIG. 2 and receives pulses therefrom from a signal track to retract the plunger. As the signal is passed on the moving tape T, spring 134 which has been tensioned by the retracted plunger contracts and retracts the pawl element to rotate the sprocket 118 through N°. The pawl places the next slide in position for projection in the device. A friction shoe 140 is mounted on wall 102 and engages the smooth periphery of disk 122 to prevent it from movement except when the pawl element is retracted by the spring.

In FIG. 6 is shown another form of projector 100a in which parts corresponding to those of projector 100 are identically numbered. The disk 122a is formed with peripheral gear teeth 123 which are engaged by teeth of a gear 125 driven by a servo-motor 55. This servo-motor will be connected in place of solenoid 50 to the output of amplifier 42 when the switch 16 is set to Play position and switch 20 is in Audio-Visual position. The servo-motor 55 will be adjusted to drive the disk 122a via gear 125 angularly through N° each time an activating pulse is applied from a selected signal track on tape T. The spring type drive means and the projector 100a shown by FIGS. 5 and 6 respectively are improvements over the projector shown in my recorder/projector Patent 2,985,069, issued May 23, 1961.

Referring now to the modification of the invention shown in FIGS. 7 to 12, inclusive, the invention contemplates the complete technological modernization of education over present medieval educational methods. One part of the invention features a Central Control Console device operated by the classroom instructor in an electronics classroom, designated generally in FIGS. 9 and 12. The classroom is provided with a plurality of rows of desks 169. At each desk there are disposed a plurality of seats 171 each to be occupied by a student in the classroom. On each desk there are a plurality of recorder-reproducer equipment 173 each assigned to one student at a seating position. Each equipment is connected to a low voltage power line 175. A microphone 177 and earphones 179 are provided at each seating position connected to a recorder-reproducer 173.

A picture strip 181 is provided for each student at a seating position. This picture strip is best shown in FIG. 10 and has a plurality of pictures 183 corresponding in subject-matter to the slides on a slide carrier plate 170 located in a slide projector 172 behind screen 174 at the front of the classroom. This projector 172 is automatically operated by electromagnetic control means controlled by a magnetic tape sound reproducer 176 which drives loudspeakers LS. The students assembled in the classroom may be instructed as a group by listening to the discussion emitted by magnetic tape sound reproducer 176 while watching the slides being projected one at a time upon screen 174. Light signal bulbs 167 are mounted on the desks 169.

Referring now to FIGS. 8 and 9, the student's recorder-reproducer equipment 173 includes a supply reel 143 and takeup reel 145 on which is engaged the student's parallel tracks magnetic tape 184. The tape is drawn by a capstan 186 coacting with a roller 188 from the supply reel to the takeup reel while signals are being recorded on the tape or being reproduced therefrom. The tape is drawn past a magnetic head assembly 190 having erase heads 192, 194 and record-reproduce heads 196, 198. Heads 192, 196 are located in alignment for the upper track I of tape 184, while heads 194, 198 are aligned for lower track II.

The reels and capstan are driven by a direct drive means 200 such as a motor which drives the tape in one direction, i.e. from left to right as shown by arrow A, while a reverse drive means 202 drives the reels and capstan to carry the tape in reverse direction from right to left for rewinding on supply reel 143. All the motors are energized from the low voltage line 158 or alternately by a battery 204. The power supply may be switched from the power line to the battery by means of double-pole switch 206 which has one pole 207 in series with the battery 204 and one pole 208 in series with the low voltage power line 158. One pole or the other closes while the remaining pole opens and vice versa.

An audio amplifier 210 has its output connected to pole 212 of the three-pole double throw selector switch 214. The input of the amplifier is connected to pole 216. Oscillator 218 is connected to pole 217. The switch has three pairs of fixed contacts 220–225, one pair for each of poles 212, 216, 226. Contact 220 is connected to pole 228 of a two-pole track selector switch 230. Contact 221 is connected to microphone 160. Contact 222 is open circuited. Contact 223 is connected to pole 232 of switch 230. Contact 224 is connected to earphones 162. Contact 225 is connected to pole 228 of switch 230. The novelty of switch 230 is set forth in my aforenamed copending patent application, Serial No. 267,881 and especially in my copending application entitled Central Controle Console for Tape Recorders, Serial No. 173,020, filed February 13, 1962, now abandoned, which features the "parallel" tracks on the tape reel of the student's recorder 173.

Contact 234 of switch 230 is connected to magnetic head 196. Contact 236 is connected to head 198. Contact 238 is connected to head 192. Contact 240 is connected to head 194. A normally closed switch 239 is interposed in the line between pole 217 and oscillator 218; similar switches may be interposed in the individual oscillator lines of erase heads 192, 194, to lend versatility to the recorder for recording sound-on-sound signals on the tracks when the respective erase head switch is opened.

The magnetic tape 184 as shown in FIGS. 8 and 9 has two tracks I and II with a leader 242 and trailer 244 at opposite ends. Track I carries spaced messages 246 corresponding to the several slides that are shown in conjunction with "printed pictures" 183, from the teacher or instructor. These messages may be impressed on track I during the discussion period when reproducer 176 is operating. This is accomplished by setting the student's equipment to record on track I. Track II contains notes, responses to questions, recitations, and the like, recorded at 248 by the student between the instructor's messages on track I.

In order to operate the student's apparatus 173 for recording messages on either tracks I or II or reproducing messages therefrom, the student will set the track selector switch 230 to the track I or track II position. Then he will set the play-record selector switch 214 to Play or Record position. In Play position, the output of amplifier 210 is connected to the earphones 179 so that the student can hear his own equipment without disturbing his neighboring students. The input to the amplifier is connected to head 196 or 198 depending on the track position of switch 230. In the Record position of switch 214, the output of the amplifier is connected to head 196 or 198 while the erase head 192 or 194 is connected to the oscillator 218 for erasing previously recorded messages from the tape. The microphone 177 is then connected to the input of the amplifier so that the student can record appropriate messages on track I or track II depending on the setting of switch 230.

The simplified structure of the tape recorder invention device 173 permits student "parallel" tracks, single amplifier, one-way universal installations at low cost in classrooms, auditoriums, and the like, for the better instruction of large number of students, both in quality and quantity.

FIG. 11 shows a type of reel which can be used for the supply and takeup reels of the apparatus 173, the novelty of the reel being particularly set forth in my copending application entitled Tape Reel for Parallel Tracks Recorders, Serial No. 155,738 filed November 29, 1961, now abandoned, and also in my copending application entitled Automatic Tape Cartridge for Magnetic Tape, Serial No. 364,877, filed April 17, 1964. Reel 250 has a bottom circular disk 252 joined to a similar upper disk 254 by a cylindrical core 256. Disk 254 has a wide angular V-shaped cutout 258. The cutout is formed with an apical portion 260. Coaxial with the apical recess 260 there is a peg 264 formed at the inner end of a radial slot 266 in the core 256. The looped end 268 of tape 184 can be engaged on this peg for winding the leading or trailing end of the tape thereon. The simplified arrangement is especially adapted for use by children and others who might have difficulty in threading tapes on the prior known types of reels.

It is not possible for the student viewer to take any notes at all during educational television and movie viewing, because the student if he does so, will certainly lose the continuity of the projected lesson respective to the program being viewed. Difficulties in taking adequate notes during lectures is the general failure problem that students are presently faced-up to during increasingly complex educational instruction. This failure problem is overcome by use of my Mono "parallel" dual-track, Track Selector control

*ized*, low cost, 5″ reel, *single* amplifier "student" tape recorder invention, which provides the student with a modern educational "tool" to tape-capture the vocal instruction part of any educational program. With "correlated" audio-signal "cues" recorded at the time of the projected slide-audio broadcast, on the upper track of his "parallel" tracks recorder, the student, with school-provided printed picture-texts corresponding to the projected slides, can now "correlate" the printed pictures with the audio sound of the broadcast, thus, *rhythmically* reviewing the complete tape-captured subject matter over-and-over again until he has thoroughly studied and learned the lesson.

The great educational advantage of the mono "parallel" tracks "student" recorder, when utilized as an educational "tool" over stereo recorders, is that the student is forced to study from the upper lesson track of the tape while again being forced into the *memory retention* principle of the invention, to independently record his mind-learning on the lower study track, by his use of Track Selector control switching from the upper study track. Low-effort use of expensive stereo recorders for simultaneous listening-recording, to simply mimic and recite the taped lesson into a stereo microphone, brings no lasting learning of the lesson.

In accordance with the invention, an instructor's Central Control Console device 353 is provided in the electronics classroom which console device is shown by FIG. 9 in circuit with the students' recorder apparatus, preferably by manual input and output double-action plug-in receptacles (not shown) installed in the students' desk 169. This console device includes an insulated shaft 354 which passes through a microphone disk 355, an earphone disk 356 and a light bulb disk 357, said disks having conductive arms 358, 359 and 360, respectively, connected to the shaft 354. The disks each carry six uniformly spaced contacts Off, C1–C6, Off, C–10–C–15 and Off, C20–C25, respectively. While only six desk positions are shown in this schematic circuit, any number of desk positions can be included in the Central Console Control device 353, and spaced contacts can be otherwise adapted into recessed fixed positions in the switch body.

The apparatus employs a preamplifier 362, a loudspeaker 364 with normally closed switch 365, and an instructor's microphone 366 connected in circuit with the switch 373. Amplifier 362 has an operating normally open switch 369 connected in circuit with arm 358 of disc 355 and is grounded. Loudspeaker 364 and amplifier 367 have said cutout switch 365, and both are grounded. The microphone 366 is grounded. An instructor's earphone 363 is connected in circuit with the switch 373 at the disk 356 by arm 359. A desk lamp bulb 361 is connected to the disk 357 by first closing switch 368. A normally closed switch 368 is operated across one wire of power supply PS. The other wire is grounded.

Referring to FIG. 12, single-action control knob 370 for the preparation of switch 373 is shown with indicator 371 at recorder position I. Dial knob numbers 1–6 are spaced circumferentially with the indicator 371. At the Off position of this single-action control switch all circuits are disconnected. At the I position shown by indicator 371, arm 358 is placed in circuit with microphone 366 and recorder input contact 221 and arm 359 places earphone 363 in circuit with recorder output contact 224, and arm 360 places PS in circuit with lamp 361. Thus, by this single-action switch control, input and output operations are made simultaneously in the operation of the Central Control Console device.

Any number of individual remote-controlled audio-visual apparatus of the present invention can be installed in box-type classrooms of present school buildings. It is preferred that said audio-visual apparatus be operated from an orderly curriculum-systemized central control-room by utilizing automatic Play-Reverse-Stop stripped tape-deck recorder systems which are operationally wired in circuit with the correspondingly related audio-sound and slide-projector apparatus as shown by FIG. 7, installed in said classrooms. Said tape-deck systems may be provided similarly to the Play-Reverse-Stop systems that are shown in my issued patents: to wit, Patent 2,952,-416, entitled Automatic Tape Recorder Including Pushbutton Control, issued September 13, 1960; Patent 2,952,-746, entitled Automatic Dual Reproducing Head for Tape Recorders, issued September 13, 1960; Patent 2,971,716, entitled Automatic Tape Cartridge for Magnetic Recorders, issued February 14, 1961; and also my patent application Serial Number 797,412, filed March 5, 1959, entitled Four Track Magnetic Tape Recorder, now abandoned, which features a dial-numbered control system for the selection of any number of repetitive Play-Reverse-Stop operations. The novel utility of this orderly centralized control-room arrangement is that the classroom instructor is not required to operate the technical audio-visual apparatus, and also not in the first instance be accountable for the prepared curricular sequence of the "correlated" master-educators' professionally programmed audio-visual classroom lessons which are superior to that of teacher-blackboard "live" programs, which very often are not sufficiently prepared at the time of presentation in the classroom.

While oscillator 57 has been described as operationally preset for 30,000 c.p.s. frequency control, it will be understood that this oscillator may be that of a known variable band sweep type, said oscillator may then be further utilized for recording certain other control signals on the recording tape; to pulse the relay means in the respective tape-deck in the central control-room of the modernized electronics school building, said relay means may be similar to the featured relay means in my aforenamed patents and copending applications, thus for said relay means to automatically actuate, On and Off, certain other apparatus in the classrooms of said modernized electronics school building such as television, lighting systems, etc.

The operations of all the technological apparatus of the present invention as assembled in the audio-visual electronics classroom, under the direction of the classroom instructor, requires no special technical training for the instructor's understanding because of the shown design simplicity of the present invention's operational switch controls for both the students' and the instructors' individual apparatus.

In operation of the assembled classroom apparatus as shown in FIGS. 7–12, the following sequential events respective to operating all the feature parts of the present invention occurs:

The instructor will first communicate with the technician who is in charge of the main audio-visual control room, which contains all of the many individual classroom recorder-tape-deck automatic Play-Reverse-Stop apparatus for controlling the Start and Stop operations of each individual audio-visual apparatus in each individual classroom, thus to Start the individual audio-visual apparatus in the respective instructor's individual classroom and thus to present the audio-visual program lesson part of the curriculum to his assembled class of students.

The second operation by the instructor will be to operate the student's recorder light-signal switch 368 to its closed position, that is if he wishes to let any individual student openly know by said light-signal that the individual student has been particularly selected by him for instructional purposes. In the open position of this light switch, the instructor can monitor any one individual selected recorder at a time which any student is operating in its Play switch position, without the students being aware of his listening-in on their studies. In the closed position of this light switch, the student's indivdual desk signal-light 167 is automatically switched on by the instructor operating the dial-numbered control knob 370.

Thus, by the instructor utilizing light control switch 368, he can therefore create subtle psychological pressures to insure disciplined student learning in the classroom.

Conversely, if the student desires to intercommunicate with the instructor respective to the subject-matter that he has under study, that student can operate a push button which may be provided on his desk, thus to close the circuit of an individual electric bulb (not shown) which can be the one that is individually registered with the number of his desk position, at the remote position where the numbered student-operated corresponding signal lights are located, which is close to the instructor's Central Control Console device. It is very obvious that both the students and the instructor can apply a great many signalling techniques during intercommunication instructional periods, by utilizing their respective light-signal systems to advantage. One particular technique that the instructor may wish to employ, is to store many of the individual student's interrogations by recording them all together, during the questioning period after the audio-visual subject-presentation, by utilizing a recorder of his own (not shown) thus to record questions, and later on can systematically make his instructional responses by operating the electronics classroom apparatus to make either choice of individual sound-on-sound tape recording on the student's tape or a general class response by broadcasting via microphone 366 and loudspeaker 364 of the Central Control Console device.

The instructor should preferably first open amplifier switch 365 to prevent classroom recorders pick-up of generally unspecified subject matter and close switch 369 before recording his sound-on-sound responses on the students' tapes.

The third operation by the instructor at the simplified controls of the Central Control Console is to actuate the single-action Selector Switch 370 to a selected one of any of the circumferentially marked dial-numbered switch positions 1—6 corresponding to the students' seating positions; whereby the instructor's microphone 366 and earphone 363 are simultaneously placed in circuit with the input and output respectively of amplifier 210 of the respective student recorder 173 that the instructor has selected by actuation of switch 370. Light bulb 361 at Light Signal position 167 of the selected desk seating position of the student is also simultaneouly activated by actuation of switch 370 when switch 369 is closed by the instructor. Therefore shown and described is the simplified operation of a novel Central Control Console intercommunication system, whereof the instructor by a single actuation of switch 370 respective to the selection positions of the switch can initiate direct intercommunication with any individual selected student's recording/reproducing equipment, by first closing switch 368 to simultaneously activate the respective Light Signal 167 at the selected seating position, thus to alert the student's attention of his presence. The intercommunication between the instructor and the student continues with the instructor operating the Central Control Console without any further necessity of actuating switch 370, on account that the instructor's earphone 363 is automatically placed in circuit with the output of the single amplifier 210 of the respectively selected recording/reproducing equipment. The instructor can now listen-in to the particular student's pre-recorded questions on the tape of that student's preferred lesson practice track shown corresponding to parallel track #2 of instructional tape 184 of tape reel 250, particularly to the marked-off position on the tape 184 that the student has prepared his recorder 173 for operation in the Play position of the Record-Play switch 214. Alternately, the student by throwing switch 214 to the Record position, and the track selector switch 230 to the Track #1 or the Track #2 position of the switch according to the subject matter placement on either one of the parallel tracks, thus places the instructor's microphone 366 automatically in circuit with the input of amplifier 210; the instructor can now further continue intercommunication with the student by directly recording on the preferred instructional parallel track #1 of tape 184 of the selected student's equipment any instructional comments respecting the student's questions that he had previously listened to via his earphone on the student's preferred practice track #2.

To accomplish sound-on-sound recording on tape 184, the student must first open oscillator switch 239 thus to open-circuit erase heads 192, 194 and by so doing elect to have the instructor speak through his console microphone 366 via preamplifier 362 to directly record sound-on-sound instructional comments over the student's prior positioned study-recordings on the respective "parallel" tape-track of tape 184 without obliteration of said study-recordings. Tape reel 250 includes the novel facility of a contrasting colored label with two sections respectively marked Index #1 and Index #2 which are to be utilized by the student to note certain prior marked positions on the "parallel" tracks of tape 184 for future quick visual reference to find the exact location of study-position places on the tape.

Alternately, for greater economical operations respective to savings on magnetic recording tapes and students' tape recorder units, individual set-ups including the operations of switch 373, microphone 366 and earphone 363 as shown in the circuit of Central Control Console device 353, can be installed at each individual student's desk position and in similar "parallel" tracks operational mode as shown in the present invention, to be in circuit with any number of main control-room operated language laboratory instructional master tape recorders which may be installed in said control-room of the electronics school building.

It is possible that television and film strips may be used to supplement slide projection in student instruction. A disadvantage of such supplements in an educational system is that the graphic projection of a fleeting image allows the student insufficient time to concentrate and learn the audible and visual subject matter instantaneously presented. This inherent deficiency is overcome in the present invention. By employing individual slides supplemented by picture sets correlated with the slides, the students can study, review, and repeat the instruction and discussion until the subject matter is thoroughly learned. Of course it is possible to use television, motion pictures and film strips as complementary educational aids for spot uses, such as in a laboratory demonstration, reports of field trips, exhibitions of news and current events, and the like.

The student will learn taped lessons effectively by utilizing the track selector for switching from the upper lesson track to the lower personal study track during periods of practice. If individual message narration on the lesson track is of lengthy duration, suitable audio signals correlated with certain portions of the lengthy message may be recorded at various intervals on the student's tapes for quicker message location during their studies.

This robot education system of the present invention including its provisions for assembling large numbers of students into an auditorium insures that all students receive *the same* teaching and instruction thus begetting the desirable goal of imparting "equal" intelligence amongst the students in educational curriculum. A single delivery of a lesson can be made to a large student body. This effects manifold economies since it is not necessary to deliver the same lesson to small student groups in individual classrooms as is now presently practiced. Under present conditions, the delivery of the same lesson to many individual student groups results in non-uniform delivery because of different educational facilities, different availability and skill of teachers, personal preferences of teachers, principals, school superintendents, etc.

The present "robot teacher" invention makes it possible to effect curriculum changes immediately in parallel with advancements in the arts and sciences. By including auditoriums of sufficient size to accommodate students of many schools, even entire school districts, and equipping theses auditoriums with audio-visual equipment as described herein, vast economies in education systems, school buildings, and teacher requirements can be effected, with concomitant improvements in the quality and quantity of instruction over that of the inadequate single-mind overnight lesson preparation methods presently employed by the "live" teacher.

It is very obvious that the above described operation of all of the assembled apparatus of the present invention is a great boon to the individual classroom teacher, inasmuch as the "live" classroom teacher is now relieved of the strain of present-day-to-day preparation of all grade-class lessons. Under the present invention, "correlated" audio-visual classroom lessons expertly prepared by psychologists, master educators who are up-to-date in their knowledge, and technicians, can be presented by the "robot teacher" for far more effective teaching of students over any combination of present methods employed alone by "live" teachers.

Included in the present invention there is the very important discovery, as shown, that the present "live" teacher is best qualified for the true role of only for instruction of students in modern audio-visual education, after the professionally prepared programmed audio-visual subject-matter presentation has been made in the classroom by the "robot teacher."

The advantages of "programmed" audio-visual lessons are many. First, the individual student can proceed at his own pace. Second, audio-visual programs can be empirically developed thus to ensure student accomplishment. Third, because the student can work largely on his own as foregoingly described, there accrues a considerable saving of the instructor's time. Fourth, the sequentially numbered and daily arranged audio-visual technological programming of every subject taught in the audio-visual classrooms, results in a continuous record of student performance. Such record is useful for educational research to improve the programs year-by-year. Fifth, the concept of the ungraded school is made completely practical through application of the audio-visual programming system of this educational invention which *materially* and *methodically* improves present unsystemized *self-contained* classroom education.

The "still" slide-projection and audio-sound of the "robot teacher" as employed by the present invention eliminates certain super-imposition over the classroom teacher by visual life-like moving "personalities" presently employed in movies and educational television programming which many teachers object to as derogative to their personal teaching status in the classroom.

The great need and reason for my invention of the "robot teacher" is, of course, that the present generation of students are required to store, computingly in their brains, a tremendous new amount of technical and other new knowledge over that of the past generations of students which have graduated with academic degrees. This is due to their being constantly exposed to the new modern communications media such as radio, television, scientific periodicals, etc. Therefore, a "revolutionary" new and better education system is needed to keep pace with the educational requirements of said students' increased knowledge. The "robot teacher" of this education invention system very well fills this great present need.

Significantly, the present invention also "works-out" that the entire mode of education methods as presently practiced in all universities and technical institutes are obsolete in their applications. Education is becoming too detail-complex in every way for the present mode of higher educational teaching to remain efficient. It is not always the high I.Q. presently college-favored quick-lesson-grasping "bright" student who, later in business life, becomes more proficient in actually applied executive analytical thinking for best successful conclusions respective to critical business decisions. The great many other millions-majority of slower minded students with their lowtest I.Q. are especially helped by the needed *rhythmic* "correlated" repetitive lesson learning system, as provided by the present invention. Thus applied, said slower minded students can therefore develop their individual latent abilities for wanted, slower, but often more deliberatively cautious executive decisions.

Because there is always inherent concentrated subject-matter in audio-visual subject-presentation by the "robot teacher," this then can newly result in shortened lesson-time-periods in classrooms. Therefore, obviously, significant savings can be made in school construction sites and all other general budgetary items, by Boards of Education.

The student's recorded tapes may be erased after lesson examinations for economical reuse, while the "printed pictures" as daily supplied by the school can be retained by each student for life-long lesson reference.

It is expected under the present invention that regular commercial interests will add supplementary educationally programmed subject-matter on tapes, slides, and "printed picture"-texts, matching with the "robot teacher" specification to broaden and enlarge State-originated regents' educational curriculum. This they are facilitated with by their utilization of my mass production tape duplication invention system, under my copending patent application entitled Bulk Tape Recording System, Serial No. 830,356, filed July 29, 1959, now abandoned, and also my copending application entitled Means for Automatically Perforating and/or Cutting Magnetic Tape, Serial Number 173,013, filed February 13, 1962, now abandoned, and Patent 2,976,372, entitled Automatic Tape Reproducing System, issued March 21, 1961.

The feature recorder-projector part of the apparatus of the present invention, coordinates slide advance with signals recorded on a selected magnetic track which is programmed to coordinate with subject-matter recorded on an associated selected magnetic track.

The invention provides multiple track selection, record and play facilities, and selectively control of a visual slide projector or of a stereo-audio channel. This track selector system can utilize additional heads for any further number of individual switch combinations, for diversified purposes.

All three feature parts comprising the present invention, as detailed above, cooperate conjunctively in their utility functions, in an exclusive logical way over all existing teaching machines.

While I have illustrated and described the preferred embodiments of my invention, it is to be understood that I do not limit myself to the precise constructions herein disclosed and that various changes and modifications may be made within the scope of the invention as defined in the appended claims.

I claim:

1. In an audio-visual educational system, in combination: projection apparatus for slides, drive means for moving a series of said slides in said apparatus past a projection position, a multiple track tape having control signals and audio messages impressed on the tracks correlated with the slides, stereo sound reproducing means including a plurality of sound-on-sound stereo audio amplifiers being connected in circuit with the respective operating magnetic head of the multiple magnetic heads in a head assembly disposed on said tracks, and a play control means being connected in circuit with said sound-on-sound stereo audio amplifiers and with the respective operating magnetic head in said head assembly for applying said messages from the respective operating track on said multiple track tape to the stereo sound reproducing means and for simultaneously applying said control signals from said track to the drive means to move the slides in said projection apparatus in coordination with the messages reproduced by the stereo sound reproducing means.

2. A multiple track magnetic tape recorder-reproducer for use in an audio-visual educational system, comprising a head assembly including multiple magnetic heads disposed to scan the tracks respectively on a multiple track tape, a record-play switch, said record-play switch having two positions determining the passing of stereo sound-on-sound audio frequency signals and control signals to and from the heads, two audio frequency sound-on-sound stereo amplifiers being connected in circuit with said record-play switch, and a third stereo amplifier limited to operation in a frequency range outside that of the audio frequency range signals and a signal generator means and a projector drive means being connected in circuit with said record-play switch; whereby the stereo sound-on-sound audio frequency signals and the control signals are respectively recorded on the respective operating track of said multiple track tape via the respective operating magnetic head in said head assembly, the two audio frequency sound-on-sound stereo amplifiers and the signal generator means when the record-play switch is in the record position, and whereby the stereo sound-on-sound audio frequency signals and the control signals are simultaneously applied respectively from the said one track from the respective operating track of said multiple track tape via the respective operating magnetic head in said head assembly to the two audio frequency stereo amplifiers to reproduce the stereo sound-on-sound audio frequency signals and to the third stereo amplifier to activate the projector drive means when the record-play switch is in the play position.

References Cited by the Examiner

UNITED STATES PATENTS

| | | | |
|---|---|---|---|
| 2,503,083 | 4/1950 | Waller. | |
| 2,613,574 | 10/1952 | Moss | 88—28 |
| 2,787,669 | 4/1957 | Flan et al. | 179—100.1 |
| 2,811,588 | 10/1957 | Julie | 88—28 X |
| 2,847,905 | 8/1958 | Novak | 88—27 |
| 2,878,321 | 3/1959 | Davis | 179—100.2 |
| 2,975,672 | 3/1961 | Shields | 88—28 |
| 3,110,216 | 11/1963 | Chalfin | 88—28 |

NORTON ANSHER, *Primary Examiner.*

WILLIAM MISIEK, *Examiner.*